United States Patent
Mabuchi

(10) Patent No.: US 6,669,349 B2
(45) Date of Patent: Dec. 30, 2003

(54) BEAM LIGHT SOURCE HAVING A BEAM-SHAPED LIGHT GUIDE

(75) Inventor: Koji Mabuchi, Ogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/953,882

(22) Filed: Sep. 18, 2001

(65) Prior Publication Data

US 2002/0034071 A1 Mar. 21, 2002

(30) Foreign Application Priority Data

Sep. 20, 2000 (JP) .................................. 2000-284964

(51) Int. Cl.⁷ ................................................ F21V 7/04
(52) U.S. Cl. .................... 362/31; 362/26; 362/558; 362/330
(58) Field of Search ........................... 362/31, 558, 26, 362/296, 297, 330, 327, 27, 561; 385/50, 901; 349/65

(56) References Cited

U.S. PATENT DOCUMENTS 5,485,354 A * 1/1996 Ciupke et al. ................. 362/31
6,168,281 B1 * 1/2001 Suzuki ........................ 362/31
6,286,970 B1 * 9/2001 Egawa et al. ................. 362/31
6,352,350 B1 * 3/2002 Ma .............................. 362/31
6,435,687 B1 * 8/2002 Fukiharu ..................... 362/31

* cited by examiner

Primary Examiner—Sandra O'Shea
Assistant Examiner—Bao Truong
(74) Attorney, Agent, or Firm—Arent Fox Kintner Plotkin & Kahn, PLLC

(57) ABSTRACT

This invention provides a beam light source which enables a light guide plate for receiving light to have a smooth end surface. A light emitting surface of the beam-shaped light guide for dispersing and emitting light emitted from a point light source in a form of beam light faces to a channel bottom surface as a scattering reflecting surface of a reflecting member. The light emitted from the light emitting surface is irregularly reflected on the channel bottom surface of the reflecting member so as to make viewing angle characteristics uniform. The light having the uniform viewing angle characteristics is transmitted from the light emitting surface of the beam-shaped light guide through a side surface opposite to the light emitting surface, and is emitted from another side surface opposite to the above side surface.

9 Claims, 5 Drawing Sheets

BEAM LIGHT SOURCE HAVING A BEAM-SHAPED LIGHT GUIDE

BACKGROUND OF THE INVENTION

1. Field of the Invention

This invention relates to a lighting device used for illuminating a display device which does not emit light itself and a beam light source suitable for using in the lighting device, particularly relates to a beam light source which enables a light incident surface of a light guide plate to be smooth, where the light guide plate disperses and emits light entering from the beam light source in a form of surface light.

2. Description of Prior Art

A display device which does not emit light itself such as a liquid crystal display can display an image clearly by reflecting light on a front surface of the display device or transmitting light from a rear surface of the display device.

A lighting device used for the display device which does not emit light itself includes a beam light source for emitting light in a form of beam light and a light guide plate for dispersing and emitting light emitted from the beam light source in a form of surface light.

Some beam light sources use a bar-shaped light emitting tube such as a cold cathode fluorescent tube, but recently a beam light source including a point light source such as a white LED lamp and a beam-shaped light guide for dispersing and emitting light emitted from the point light source in a form of beam light is commonly used in order to reduce power consumption.

As shown in a front cross sectional view of FIG. 9 illustrating a basic structure and a side cross sectional view of FIG. 10 schematically showing such the conventional beam light source, the beam light source includes point light sources 201, 202 respectively facing to both end surfaces 204, 205 of a beam-shaped light guide 203, and enables light emitted from both of the point light sources 201, 202 to enter both of the end surfaces 204, 205 of the beam-shaped light guide 203 without leak.

The beam-shaped light guide 203 includes a reflecting surface 206 having many of V-shaped grooves 206a for reflecting light incident from the end surfaces 204, 205 in a direction orthogonal to an axis of the beam-shaped light guide 203, and a light emitting surface 207 for emitting light reflected on the reflecting surface 206 outside the beam-shaped light guide 203.

The point light sources 201, 202 and the beam-shaped light guide 203 are arranged in a reflecting member 208 having a channel section shape. The reflecting member 208 controls a direction of the light emitted from the beam-shaped light guide 203. The reflecting member 208 including a silver reflecting surface 208a on an inner surface of the reflecting member 208, covers three side surfaces of the beam-shaped light guide 203 except for the light emitting surface 207. To be concrete, the reflecting surface 206 of the beam-shaped light guide 203 is positioned on a bottom of the channel section shaped reflecting member 208 and the light emitting surface 207 is positioned on an opening of the reflecting member 208 so that light is emitted from the light emitting surface 207 to the opening of the channel section shaped reflecting member. The light, as indicated by viewing angle characteristics 209, is deviated and is emitted irregularly. The distribution of the light varies depending on a distance from the point light sources 201, 202.

As shown in FIG. 10, the opening of the reflecting member 208 is closed by an end edge of the surface light guide plate 210, and all of light emitted from the beam light source 200 enters an end surface 211 of the light guide plate 210 which closes the opening of the reflecting member 208. The end surface 211 is formed in a rough surface having fine dots by crape process so that light is regularly distributed into the light guide plate 210 as indicated by viewing angle characteristics 212.

When the end surface 211 of the light guide plate 210 is a rough surface, cost for processing in the rough surface is required. In addition, this structure raises problems such that the incident light is not distributed regularly because of a draft angle of a mold for the light guide plate 210, a rough surface can not be processed because of difficulty in releasing the mold from the end surface 211, and the end surface 211 of a rough surface is likely to be damaged and generates resin powder when the surface 211 contacts with other object.

SUMMARY OF THE INVENTION

This invention was made to provide a beam light source and a lighting device using the same, which enables a light guide plate for receiving light to have a smooth end surface so that the conventional problems are solved.

A beam light source comprises a point light source, a beam-shaped light guide including a light incident surface for receiving light emitted from the point light source, many of reflecting surfaces for reflecting light received on the light incident surface to a direction orthogonal to an axis direction of the beam-shaped light guide, a light emitting surface for emitting light reflected on the reflecting surface, and a side surface opposite to the light emitting surface. The beam light source further comprises a reflecting member having a channel section shape for controlling an emitting direction of light emitted from the beam-shaped light guide, and a scattering reflecting surface, which is formed on at least a channel bottom surface of the reflecting member, for irregularly reflecting light. The light emitting surface of the beam-shaped light guide is arranged so as to face to the channel bottom surface of the reflecting member. Light emitted from the light emitting surface of the beam-shaped light guide is irregularly reflected on the scattering reflecting surface on the channel bottom surface to make viewing angle characteristics uniform. The light is transmitted from the light emitting surface of the beam-shaped light guide through the side surface, and is dispersed and emitted in a form of beam light from the side surface. A lighting device comprises the beam light source and a surface light guide plate for receiving light from the beam light source on one end surface and dispersing and emitting the light from either or both of front and rear surfaces in a form of surface light.

With this structure, light emitted from the point light source, transmitting through the light incident surface of the beam-shaped light guide, and received on the reflecting surface of the beam-shaped light guide is focused within a critical angle, which is determined by a refraction rate of beam-shaped light guide material, and travels in the beam-shaped light guide. A part of the light reaches to the reflecting surface, and the light having a greater angle than the critical angle to the reflecting surface regularly reflects and travels to the light emitting surface. The light which has a smaller angle than the critical angle to the light emitting surface is emitted from the light emitting surface to outside of the beam-shaped light guide.

The light emitted from the light emitting surface in such the way has deviation in the viewing angle characteristics and is emitted irregularly. In addition, the distribution varies depending on a distance from the point light source.

When the emitted light reaches on the scattering reflecting surface as a channel bottom surface of the reflecting member, the light is reflected to the beam-shaped light guide as reflecting light having approximately uniform viewing angle characteristics. The reflected light having approximately uniform viewing angle characteristics is incident from the light emitting surface of the beam-shaped light guide into the beam-shaped light guide. A part of the light is reflected on the reflecting surface, and the other is transmitted through the beam-shaped light guide and is emitted from a side surface opposite to the light emitting surface to outside of the beam-shaped light guide.

The light incident from the side surface opposite to the light emitting surface with the approximately uniform viewing angle characteristics is incident to the light incident surface of the light guide plate. Thus it is not necessary to make the light incident surface rough in order to have light distribution in the light guide plate uniform, so that the light incident surface can be a smooth surface.

Accordingly, cost for processing the light incident surface of the light guide plate into a rough surface can be saved. In addition, light distribution of the light incident to the light guide plate can be uniform irrespective of a draft angle of a mold, and it becomes easy to release from the mold for the light guide plate. Furthermore, even when the light incident surface of the light guide plate contacts with other object, the surface is prevented from being damaged and swarf is prevented from being generated.

Figure 1:
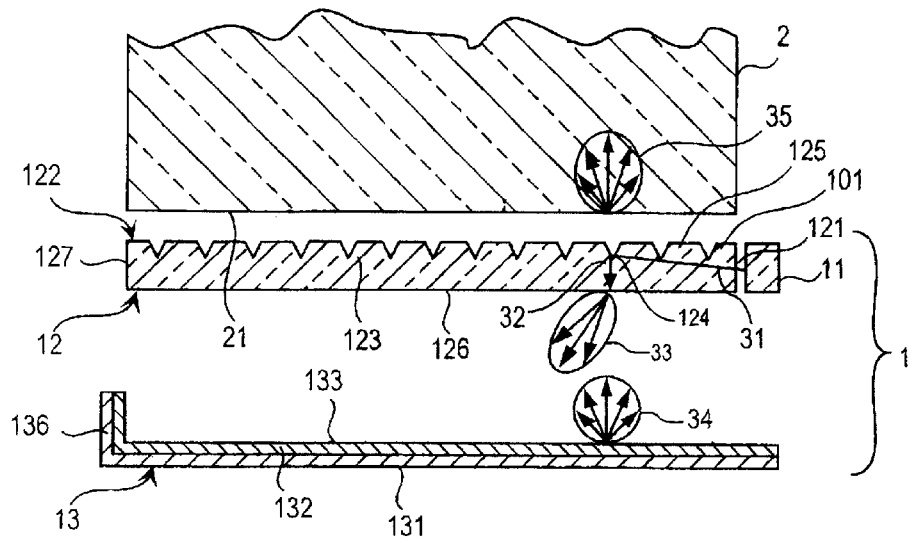
FIG. 1 is a front cross sectional view illustrating a basic structure of this invention.

The foregoing and other objects, features, aspects and advantages of the present invention will become more apparent from the following detailed description of the present invention when reviewed in conjunction with the accompanying drawings.

DESCRIPTION OF PREFERRED EMBODIMENTS

A beam light source according to one embodiment of this invention is explained in detail by referring to the drawing.

Figure 2:
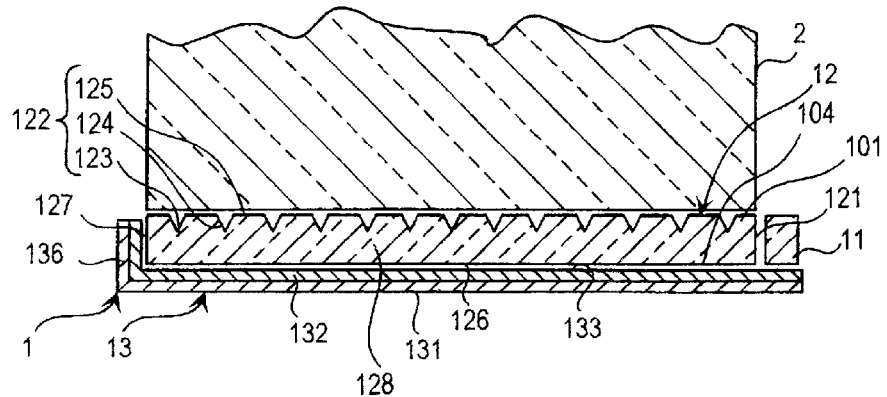
FIG. 2 is a front cross sectional view of one embodiment of this invention.
Figure 3:
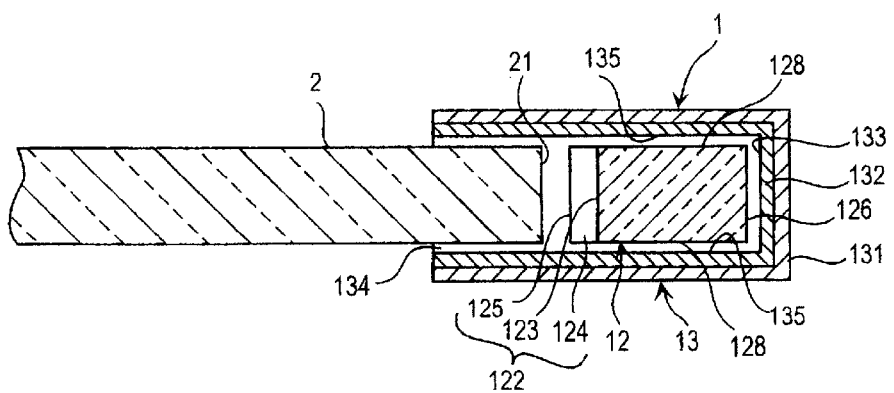
FIG. 3 is a side cross sectional view of the one embodiment of this invention.

The beam light source 1 according to the one embodiment of this invention, as shown in the front cross sectional view of FIG. 1 illustrating the basic structure, the front cross sectional view of FIG. 2, and the side cross sectional view of FIG. 3, is combined with a surface light guide plate 2 for receiving light emitted from the beam light source and dispersing and emitting the light in a form of surface light, and is used as a backlight for a transmission type liquid crystal display and a front light of a reflection liquid crystal display.

The beam light source 1 comprises a point light source 11 such as a white LED lamp, a beam-shaped light guide 12, and a channel section shaped reflecting member 13. The point light source 11 faces to a light incident surface 121, which is an end surface of the beam-shaped light guide 12. Light emitted from the point light source 11 enters from the light incident surface 121 to the beam-shaped light guide 12.

The beam-shaped light guide 12 is formed of thermoplastic resin which transmits light such as acrylic resin and polycarbonate resin, and is formed in a right prism shape having a rectangular shape in cross section.

Many of V-shaped grooves 123 having a peak angle of approximately 90° are formed with an appropriate interval on a side surface 122 of the beam-shaped light guide 12. Many of reflecting surfaces 124 for reflecting a part of light entered into the beam-shaped light guide 12 in a direction opposite to the side surface 122 is formed on side surfaces of the V-shaped grooves 123. The side surface 122 consists of the V-shaped grooves 123 and flush smooth surfaces 125.

A side surface opposite to the side surface 122 is a smooth surface parallel to the smooth surfaces 125, and serves as a light emitting surface 126 which is smooth and transmits most of light reflected on the reflecting surfaces 124 and emits the light outside the beam-shaped light guide 12.

The reflecting member 13 includes a backing frame 131 of a channel-shaped material and a light scattering reflecting sheet 132 attached on an entire surface of an inside of the channel. The point light source 11 and the beam-shaped light guide 12 are arranged inside the channel. The light scattering reflecting sheet 132 is formed of such as a sliver reflecting sheet with an embossed surface.

The beam-shaped light guide 12, as shown in FIG. 3, is inserted in the channel so that the light emitting surface 126 faces to a channel bottom surface 133 and the side surface 122 opposite to the surface 126 faces to a channel opening 134.

It is preferred to arrange the beam-shaped light guide so that the light emitting surface 126 is as close as possible to the channel bottom surface 133 in order to reduce the size, and is more preferred to arrange so that the surface 126 is contact with the bottom surface 133.

It is also preferred to arrange the beam-shaped light guide so that the distance between a side surface 128 of the beam-shaped light guide 12 and a channel side surface 135 of the reflecting member 13 is as small as possible in order to prevent light leakage and reduce the size. It is further preferred to arrange so that the side surface 128 and the channel side surface 135 are contact each other.

The reflecting member 13 further includes a channel end surface 136 which faces to an end surface 127 opposite to the light incident surface 121 of the beam-shaped light guide 12 and closes the channel. The light scattering reflecting sheet 132 is attached also on an inside of the channel end surface 136 so as to improve light utilization efficiency.

The channel opening 134 of the reflecting member 13 is closed by an end edge of the light guide plate 2. As described later, light emitted from the side surface 122 of the beam-shaped light guide 12 to the light guide plate 2 is incident from a light incident surface 21 of the light guide plate 2 to an inside of the light guide plate 2.

As shown in FIG. 1, light 31 emitted from the point light source 11 and incident from the light incident surface 121 to the inside of the beam-shaped light guide 12 is focused to have an angle not larger than a critical angle determined from a refraction rate of the material for forming of the beam-shaped light guide 12 and travels the inside of the beam-shaped light guide 12. A part of the light reaches to one of the reflecting surfaces 124 and light 32 having a larger angle than the critical angle with respect to the reflecting surface 124 is regularly reflected and travels to the light emitting surface 126. Light which has a smaller angle than the critical angle with respect to the light emitting surface 126 out of the light 32 traveling to the light emitting surface 126 is emitted from the light emitting surface 126 to outside of the beam-shaped light guide 12.

Light 33 emitted from the light emitting surface 126 as described above has deviation in viewing angle characteristics as in the case of the light emitted from the light emitting surface of the conventional beam-shaped light guide and is irregularly emitted. In addition, distribution of the light varies depending on a distance from the point light source 11.

However, when the emitted light 33 reaches the light scattering reflecting sheet 132 on the channel bottom surface 133 of the reflecting member 13, the light is reflected to the beam-shaped light guide 12 as reflected light 34 having approximately uniform viewing angle characteristics. The reflected light having approximately uniform viewing angle characteristics is incident from the light emitting surface 126 of the beam-shaped light guide 12 to the inside of the light guide 12. Although a part of the light is reflected on the reflecting surface 124, most of the light is transmitted through the beam-shaped light guide 12, is emitted from the smooth surfaces 125 between the reflecting surfaces 124 to the outside of the beam-shaped light guide 12, and is incident to the light incident surface 21 of the light guide plate 2.

Therefore light 35 having approximately uniform viewing angle characteristics is incident to the light incident surface 21 of the light guide plate 2. Thus, the light incident surface 21 does not need to be rough, but can be smooth.

Accordingly because the incident surface 21 is formed in a smooth surface, it becomes unnecessary to process the light incident surface into a rough surface, referred as a crape process. As a result, cost for such the process can be eliminated and distribution of the incident light to the light guide plate 2 becomes sufficiently uniform irrespective of a draft angle of a mold. Furthermore, it becomes easy to release the light guide plate 2 from the mold. Also, even when the light incident surface 21 of the light guide plate 2 contacts with something, the surface is prevented from being damaged and swarf is prevented from being generated.

Figure 4:
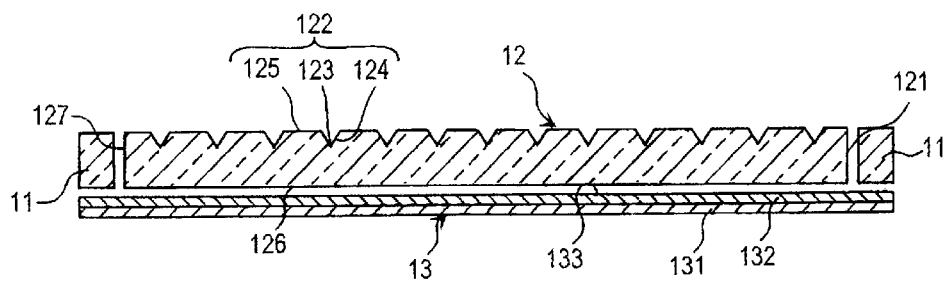
FIG. 4 is a front cross sectional view of another structural example of the one embodiment of this invention.

In this embodiment, only the one point light source 11 is arranged. However, as shown in a front cross sectional view of FIG. 4, two point light sources 11 may be arranged on both ends of the beam-shaped light guide 12 so that light can be incident from both end surfaces 121, 127 of the beam-shaped light guide 12.

Figure 5:
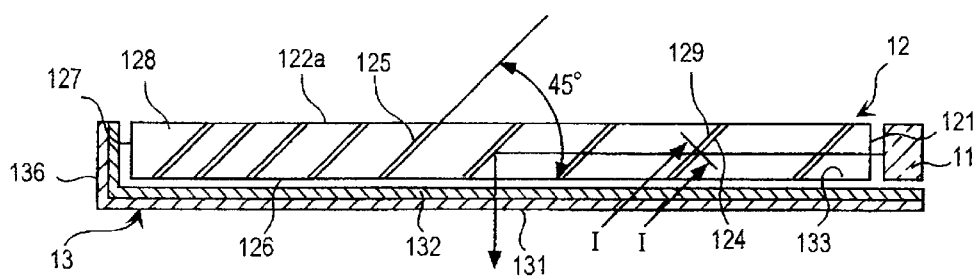
FIG. 5 is a front cross sectional view of another embodiment of this invention.
Figure 6:
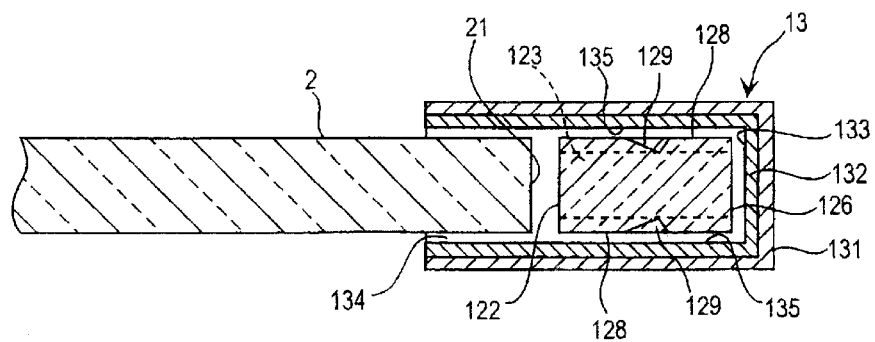
FIG. 6 is a side cross sectional view of the embodiment of this invention shown in FIG. 5.
Figure 7:
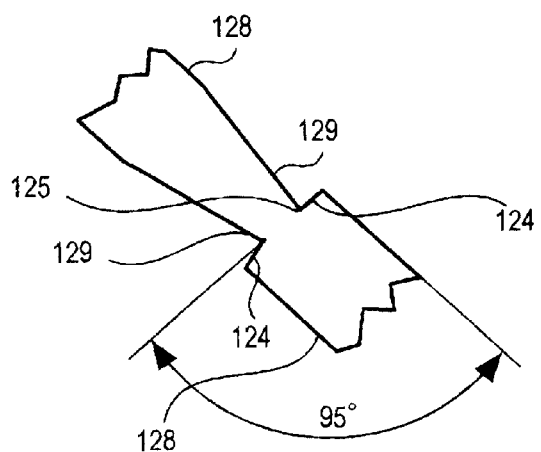
FIG. 7 is a cross sectional view taken along the I—I line of FIG. 5.

A beam light source according to another embodiment of this invention shown in a front cross sectional view of FIG. 6 and a side cross sectional view of FIG. 6 is different from the above embodiment in a surface for forming the reflecting surface 124. The reflecting surface 124 is formed on the side surface 128 formed of one side of the light incident surface 121 (127) and one side of the light emitting surface 126. As shown in FIGS. 5, 6, many of V-shaped grooves 129 sloping on one side are formed on both of the side surfaces 128 of the beam-shaped light guide 12 facing to both of the channel side surfaces 135 of the reflecting member 13, wherein the grooves are extended to a direction inclining at 45° to the light emitting surface 126 when viewed from the front. Then, as shown in an enlarged cross sectional view of FIG. 7, the reflecting surface 124 is formed on a side surface of the V-shaped groove 129 which crosses with the side surface 128 at approximately 90° (for example at 95° when considering a draft angle). A side surface 122a opposite to the light emitting surface 126 is a smooth surface.

Other structural elements and effects of this embodiment are the same as in the above described embodiment, and detailed explanation on them is omitted.

Figure 8:
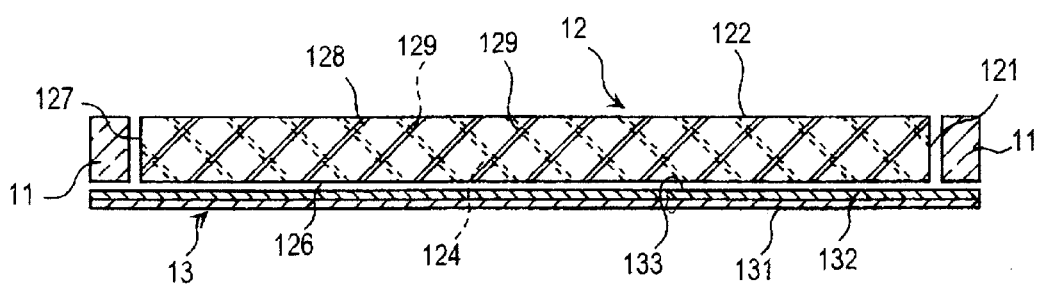
FIG. 8 is a front cross sectional view of further another embodiment of this invention.
Figure 9:
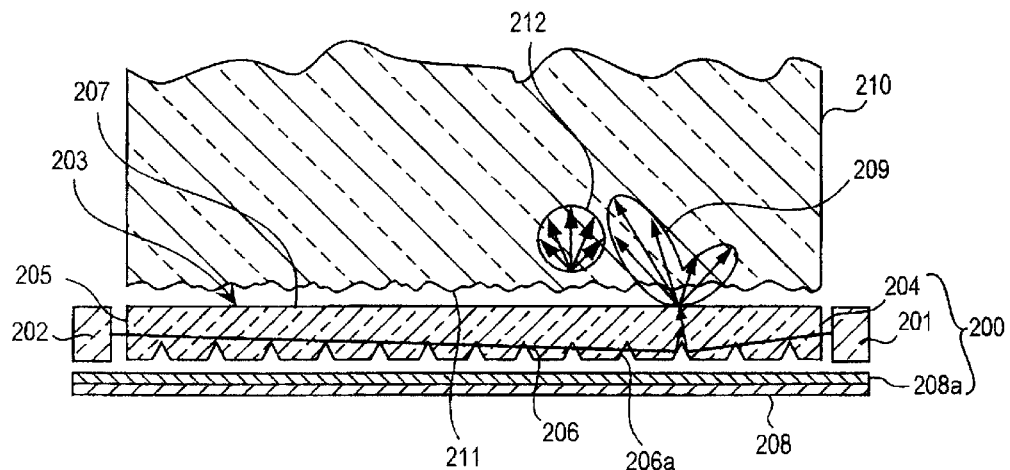
FIG. 9 is a front cross sectional view of a basic structure of a conventional example.
Figure 10:
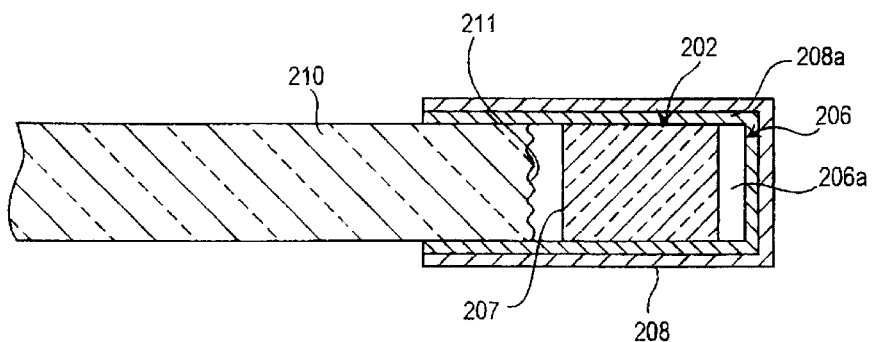
FIG. 10 is a cross sectional view of the conventional example.

A beam light source according to another embodiment of this invention is shown in a front cross sectional view of FIG. 8. Many of V-shaped grooves 129 sloping on one side are formed on a pair of the side surfaces 128 of the beam-shaped light guide 12 facing to both of the channel side surfaces 135 of the reflecting member 13, wherein the grooves are extended to a direction inclining at 45° or 135° to the light emitting surface 126 when viewed from the front. Light is emitted from a pair of the point light sources 11 arranged on both end outer sides of the beam-shaped light guide 12 and is incident to the beam-shaped light guide 12.

Other structural elements and effects of this embodiment are the same as in the above described embodiments, and detailed explanation on them is omitted.

Although the reflecting member 13 used in the above embodiments has a channel section shape of an E-steel shape, it can have of a U-steel shape to obtain the same effects.

Although the present invention has been described and illustrated in detail, it should be clearly understood that the description discloses examples of different embodiments of the invention and is not intended to be limited to the examples or illustrations provided. Any changes or modifications within the spirit and scope of the present invention are intended to be included, the invention being limited only by the terms of the appended claims.

What is claimed is:

1. A beam light source, comprising:

a point light source;

a beam-shaped light guide including a light incident surface for receiving light emitted from the point light source, a plurality of reflecting surfaces for reflecting light received via the light incident surface in a direction orthogonal to an axial direction of the beam-shaped light guide and opposite to the light incident surface, a light emitting surface, which is orthogonal to the light incident surface, for emitting the light reflected on the reflecting surface, and a side surface opposite to the light emitting surface;

a reflecting member having a channel section shape for controlling the light emission direction of light emitted from the beam-shaped light guide; and a scattering reflecting surface, which is formed on at least a channel bottom surface of the reflecting member, for irregularly reflecting light, wherein the light emitting surface of the beam-shaped light guide is arranged so as to face to the channel bottom surface of the reflecting member, light emitted from the light emitting surface of the beam-shaped light guide is irregularly reflected on the scattering reflecting surface on the channel bottom surface to make viewing angle characteristics uniform, is transmitted from the light emitting surface of the beam-shaped light guide through the side surface, and is dispersed and emitted in a form of beam light from the side surface.

2. The beam light source according to claim 1, wherein the reflecting surfaces are formed by spacing apart with an appropriate interval in the axis direction of the beam-shaped light guide.

3. The beam light source according to claim 1, wherein the reflecting surfaces are formed on the side surface.

4. The beam light source according to claim 1, wherein the beam-shaped light guide has a right prism shape, and the reflecting surfaces are formed on a surface formed of a side of the light incident surface and a side of the light emitting surface.

5. A lighting device, comprising:

a point light source;

a beam-shaped light guide for dispersing and emitting light emitted from the point light source in a form of beam light;

a reflecting member having a channel section shape for controlling the light emission direction of light emitted from the beam-shaped light guide; and a surface light guide plate for receiving light from a beam light source on an end surface and dispersing and emitting the light from either or both of front and rear surfaces in a form of surface light;

wherein the beam-shaped light guide includes a light incident surface for receiving light emitted from the point light source, a plurality of reflecting surfaces for reflecting light received via the light incident surface in a direction orthogonal to an axial direction of the beam-shaped light guide and opposite to the light incident surface, a light emitting surface, which is orthogonal to the light incident surface, for emitting light reflected on the reflecting surface, and a side surface opposite to the light emitting surface, and the reflecting member includes a scattering reflecting surface, which is formed on at least a channel bottom surface, for irregularly reflecting light, the light emitting surface of the beam-shaped light guide is arranged so as to face to the channel bottom surface of the reflecting member, light emitted from the light emitting surface of the beam-shaped light guide is irregularly reflected on the scattering reflecting surface on the channel bottom surface to make viewing angle characteristics uniform, is transmitted from the light emitting surface of the beam-shaped light guide through the side surface, and is incident from the side surface to an end surface of the surface light guide plate in a form of beam light.

6. The lighting device according to claim 5, wherein the end surface of the surface light guide plate is formed in a smooth surface.

7. The lighting device according to claim 5, wherein the reflecting surfaces are formed by spacing apart by an appropriate interval in the axis direction of the beam-shaped light guide.

8. The lighting device according to claim 5, wherein the reflecting surfaces are formed on the side surface.

9. The lighting device according to claim 5, wherein the beam-shaped light guide has a right prism shape, and the reflecting surfaces are formed on a surface formed of a side of the light incident surface and a side of the light emitting surface.

\* \* \* \* \*